(No Model.)

J. GILGOUR.
NUT LOCK.

No. 296,948. Patented Apr. 15, 1884.

Witnesses:

Inventor
John Gilgour

Attorney.

UNITED STATES PATENT OFFICE.

JOHN GILGOUR, OF COLUMBUS, INDIANA.

NUT-LOCK.

SPECIFICATION forming part of Letters Patent No. 296,948, dated April 15, 1884.

Application filed December 20, 1883. (No model.)

*To all whom it may concern:*

Be it known that I, JOHN GILGOUR, a citizen of the United States of America, residing at Columbus, in the county of Bartholomew and State of Indiana, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in nut-locks; and it is designed more especially as an improvement upon the Letters Patent granted to me on the 15th day of May, 1883, the object of my present invention being the same, though the construction is slightly different, and possesses advantages over the hereinbefore-mentioned patent.

Figure 1:
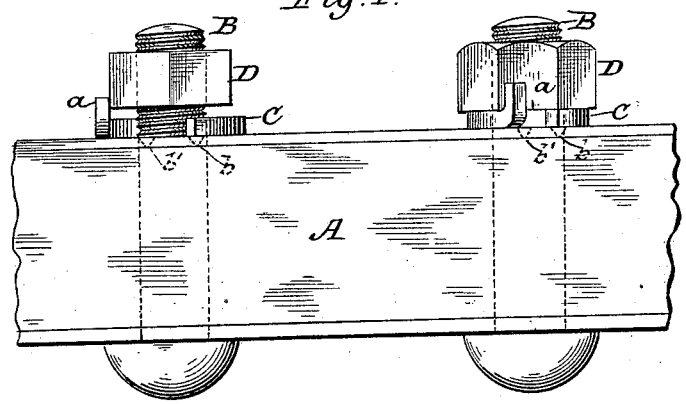
Figure 2:
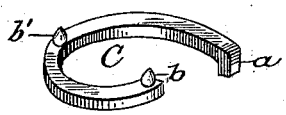
Figure 3:
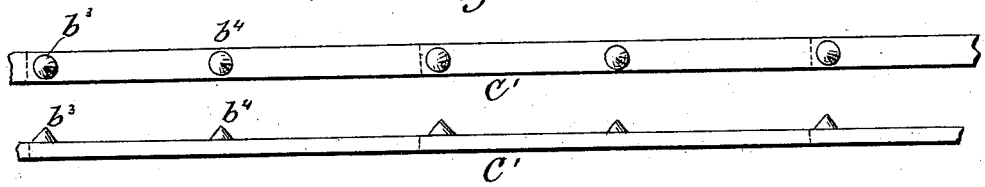

In the accompanying drawings, which illustrate my invention, Figure 1 is a side view; Fig. 2, a detailed perspective view of the locking-washer reversed, and Fig. 3 a plan and side view of the blank from which my improved locking-washer is made.

In the accompanying drawings, A represents a rail or other object to which it is desired to secure, by means of bolts, side plates or other objects, the drawings illustrating my invention as applied to a railroad-rail, the side pieces being the fish-plate.

B represents a bolt of ordinary construction, and D the nut, the locking-washer being indicated by the letter C.

The operation and construction of my locking-washer are substantially the same as those shown in my previous patent; and my present invention consists in adding to said washer or open ring an additional projection, the projection at the end of the washer being indicated by the letter $b$, while at an intermediate point between the ends of the washer, as shown, is formed an additional point or projection, $b'$, the object of this additional projection being to prevent the washer turning when it is being bent into line or into the path of the nut.

In manufacturing my improved nut-lock, steel bars are rolled so as to form upon said bars (indicated by the letter $C'$) projections $b^3 b^4$, which projections are formed upon said bars with alternate spaces between the same, and when the bar of steel is rolled in this manner it is only necessary to bend the same into the proper shape and turn up the end, (indicated by the letter $a$,) when the device is in a condition to be supplied to the trade.

The manner of locking a nut is as follows: The washer or open ring is placed over the end of the bolt, the projections being on the under side of the same. The nut is then screwed "home," which forces the projections into the underlying surface and holds the washer or ring rigid. The upturned end of the ring is then bent, so as to engage with one of the sides of the nut, thus locking the same.

By the construction shown, the nut may be screwed in place without striking the outer end of the ring with its upturned end, the ring being bent so that its ends project outward and apart from each other, the end which is upturned being in a circumference of larger radius than that in which the other end lies.

Having thus described my invention, what I claim as new, and desire to secure by Letters Patent, is—

1. As a new article of manufacture, a washer for locking nuts upon bolts, having the projections $b\ b'$ formed on one side of the same, and an upturned end, $a$, the diameter of the washer being enough larger than the diameter of the bolt to permit the upturned end to be bent into or out of the path of the nut by bending the washer at a point between its upturned end and the projection $b'$.

2. A device for locking-nuts, consisting of an open ring, one end of which projects outward and apart from the other, so that its upturned end is in a circumference of longer radius than that in which the inner end lies, and having on its under side two or more projections, whereby the nut may be screwed to place without striking the outer end of the ring, and may force the projections into the underlying surface, and the outer end may then be bent inward against the side of the nut, substantially as and for the purpose stated.

In testimony whereof I affix my signature in presence of three witnesses.

JOHN GILGOUR.

Witnesses:
BENJAMIN R. IRWIN,
JOHN B. COBB,
S. STANSIFER.